(12) United States Patent
Crawford et al.

(10) Patent No.: US 10,918,994 B2
(45) Date of Patent: Feb. 16, 2021

(54) INDUCTION HEATING APPARATUS AND METHODS

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto (CA)

( * ) Notice: Subject to any disclaimer, the term of this patent is extended or adjusted under 35 U.S.C. 154(b) by 346 days.

(21) Appl. No.: 15/907,698

(22) Filed: Feb. 28, 2018

(65) Prior Publication Data
US 2018/0185789 A1    Jul. 5, 2018

Related U.S. Application Data

(63) Continuation-in-part of application No. 15/279,423, filed on Sep. 28, 2016, now Pat. No. 10,226,738.
(Continued)

(51) Int. Cl.
*B01D 53/94* (2006.01)
*B01J 35/04* (2006.01)
(Continued)

(52) U.S. Cl.
CPC ..... *B01D 53/9431* (2013.01); *B01D 53/9418* (2013.01); *B01J 35/04* (2013.01);
(Continued)

(58) Field of Classification Search
CPC ...... F01N 3/0892; F01N 2240/28; F01N 3/01; F01N 13/02; F02B 3/06
See application file for complete search history.

(56) References Cited

U.S. PATENT DOCUMENTS 3,581,489 A * 6/1971 Camin .................. B01J 8/067
  60/275
3,779,710 A * 12/1973 Burstein ................ B01D 53/86
  422/121
(Continued)

FOREIGN PATENT DOCUMENTS

DE    43 41 380 A1   6/1995
DE    694 05 929 T2  1/1998
(Continued)

*Primary Examiner* — Mark A Laurenzi
*Assistant Examiner* — Mickey H France
(74) *Attorney, Agent, or Firm* — Stuart L. Wilkinson

(57) ABSTRACT

An assembly for use in treating gaseous exhaust emissions has an inductive heater mounted next to a gaseous emissions treatment unit. and downstream substrate units or upstream and downstream sections of a single substrate. The upstream unit or section has linear passages extending the length of the first substrate body for the passage of emissions gas but with some of the passages blocked by metal inserts for use in inductive heating of the upstream unit. The concentration of metal inserts is high and the metal inserts are distributed to enable rapid intense inductive heating of the slice or section to achieve "light off" temperature rapidly in order to pass heat-supplemented gaseous emissions at light-off temperature to the downstream substrate or section as quickly as possible.

17 Claims, 4 Drawing Sheets

Related U.S. Application Data which is a continuation-in-part of application No. 14/452,800, filed on Aug. 6, 2014, now Pat. No. 9,488,085.

(60) Provisional application No. 62/234,166, filed on Sep. 29, 2015, provisional application No. 62/306,885, filed on Mar. 11, 2016, provisional application No. 62/322,719, filed on Apr. 14, 2016, provisional application No. 62/258,071, filed on Nov. 20, 2015, provisional application No. 61/879,211, filed on Sep. 18, 2013, provisional application No. 61/910,067, filed on Nov. 28, 2013.

(51) Int. Cl.
*F01N 3/20* (2006.01)
*F01N 3/28* (2006.01)
*F01N 3/035* (2006.01)
*F01N 13/00* (2010.01)
*F01N 3/26* (2006.01)

(52) U.S. Cl.
CPC .......... *F01N 3/035* (2013.01); *F01N 3/2013* (2013.01); *F01N 3/2066* (2013.01); *F01N 3/2828* (2013.01); *F01N 3/2889* (2013.01); *F01N 13/0097* (2014.06); *B01D 2255/40* (2013.01); *B01D 2255/50* (2013.01); *B01D 2255/915* (2013.01); *F01N 3/26* (2013.01); *F01N 3/2892* (2013.01); *Y02T 10/12* (2013.01)

(56) References Cited

U.S. PATENT DOCUMENTS

| | | | | |
|---|---|---|---|---|
| 3,785,778 | A | * | 1/1974 | Burstein ................ B01D 53/34 422/171 |
| 4,007,589 | A | * | 2/1977 | Neidhard .............. F01N 11/002 60/276 |
| 5,180,559 | A | * | 1/1993 | Ma .......................... F01N 3/202 422/168 |
| 5,569,455 | A | | 10/1996 | Fukui |
| 2015/0075137 | A1 | | 3/2015 | Crawford et al. |
| 2017/0014764 | A1 | | 1/2017 | Crawford et al. |

FOREIGN PATENT DOCUMENTS

| | | | | |
|---|---|---|---|---|
| EP | 0 574 012 A2 | | 12/1993 | |
| EP | 0574012 A2 | * | 12/1993 | .......... B01D 53/945 |
| GB | 2 231 813 A | | 11/1990 | |
| JP | 08028250 A | * | 1/1996 | ............ H05B 6/108 |
| JP | 08326522 A | * | 12/1996 | |
| JP | 11336534 A | * | 12/1999 | |
| JP | 2007236638 A | * | 9/2007 | |
| JP | 2009225602 A | * | 10/2009 | |
| JP | 2010024910 A | * | 2/2010 | |
| JP | 2013199394 A | * | 10/2013 | |
| WO | 94/01202 A1 | | 1/1994 | |

* cited by examiner

INDUCTION HEATING APPARATUS AND METHODS

CROSS REFERENCE TO RELATED PATENTS

The present application is a continuation in part of U.S. patent application Ser. No. 15/279,423 filed Sep. 28, 2016 entitled "Apparatus and method for gaseous emissions treatment using front end induction heating" which claims priority pursuant to 35 U.S.C. § 119(e) from:
U.S. Provisional Application Ser. No. 62/234,166 filed Sep. 29, 2015 entitled "Catalytic converter structures with directed induction heating";
U.S. Provisional Application Ser. No. 62/258,071 filed Nov. 20, 2015 entitled "Catalytic converter system with controlled induction heating and methods for use";
U.S. Provisional Application Ser. No. 62/306,885 filed Mar. 11, 2016 entitled "Structures for inductive heating"; and
U.S. Provisional Application Ser. No. 62/322,719 filed Apr. 14, 2016 entitled "Induction heating structures".
U.S. patent application Ser. No. 15/279,423 is a continuation in part of U.S. patent application Ser. No. 14/452,800 entitled "Catalytic converter structures with induction heating" filed Aug. 6, 2014 which claims priority pursuant to 35 U.S.C. § 119(e) from
U.S. Provisional Application Ser. No. 61/879,211 entitled "Catalytic converter employing electrohydrodynamic technology" filed Sep. 18, 2013, and
U.S. Provisional Application Ser. No. 61/910,067 entitled "Catalytic converter employing electrohydrodynamic technology" filed Nov. 28, 2013.

The disclosures of the above-numbered applications are hereby incorporated herein by reference in their entirety and made part of the present application for all purposes.

FIELD OF THE INVENTION

This invention relates induction heating structures and methods and has particular but not exclusive application to catalytic converters, particulate filters (PFs) and like structures for treating exhaust gases to reduce harmful pollution.

BACKGROUND

The U.S. Department of Transportation (DOT) and the U.S. Environmental Protection Agency (EPA) have established U.S. federal rules that set national greenhouse gas emission standards. Beginning with 2012 model year vehicles, automobile manufacturers required that fleet-wide greenhouse gas emissions be reduced by approximately five percent every year. Included in the requirements, for example, the new standards decreed that new passenger cars, light-duty trucks, and medium-duty passenger vehicles had to have an estimated combined average emissions level no greater than 250 grams of carbon dioxide ($CO_2$) per mile in vehicle model year 2016.

Catalytic converters and DPFs are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

Catalytic converters and PFs have low efficiency when cold, i.e. the running temperature from ambient air start-up temperature to a temperature of the order typically of 300 C or "light-off" temperature, being the temperature where the metal catalyst starts to accelerate the pollutant conversion processes previously described. Light-off is often characterized as the temperature at which a 50% reduction in toxic emissions occurs and for gasoline is approximately 300° C. Below light-off temperature, little to no catalytic action takes place. This is therefore the period during a vehicle's daily use during which most of the vehicle's polluting emissions are produced. Getting the catalytic converter or PF hot as quickly as possible is important to reducing cold start emissions.

Copending U.S. patent application Ser. No. 14/452,800 (Catalytic converter structures with induction heating) shows a catalytic converter assembly having a substrate body with a plurality of cells for cell therethrough of exhaust gases. Metal is located at predetermined locations in the substrate body and an electromagnetic field generator is mounted adjacent the substrate body for generating a varying electromagnetic field inductively to heat the metal and so heat the substrate body.

SUMMARY OF THE INVENTION

Brief Description of the Drawing

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
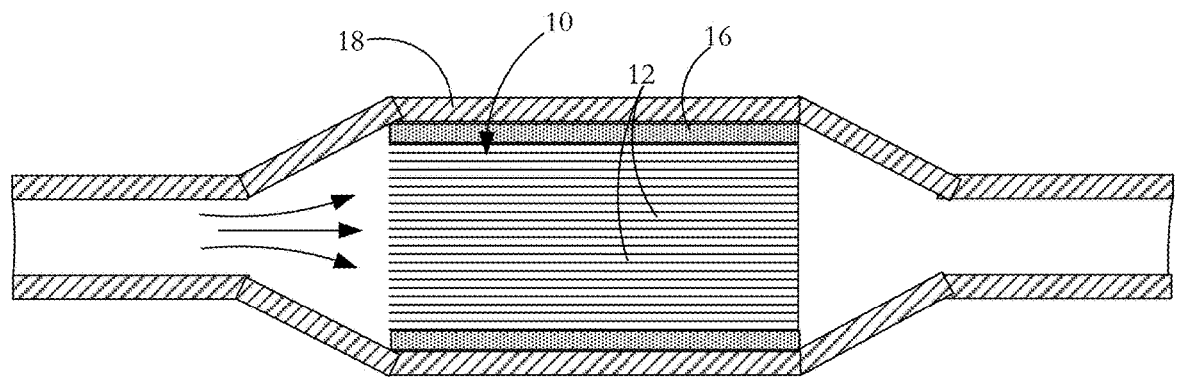
FIG. 1 is a longitudinal sectional view of a prior art gaseous emissions treatment unit.

A gaseous emissions treatment assembly may take any of a number of forms. Typical of these is a known catalytic converter having a cylindrical substrate body 10 usually made of ceramic material and often called a brick, an example of which is shown in FIG. 1. The brick has a honeycomb structure in which a number of small area passages or cells 12 extend the length of the brick, the cells being separated by walls 14. There are typically from 400 to 900 cells per square inch (cpsi) of cross-sectional area of the substrate body 10 and the walls are typically in the range 0.003 to 0.008 inches in thickness. Typically, the ceramic substrate body 10 is formed in an extrusion process in which green ceramic material is extruded through an appropriately shaped die and units are cut successively from the extrusion, the units being then cut into bricks. The areal shape of the cells or passages 12 may be whatever is convenient for contributing to the overall strength of the substrate body 10 while presenting a large contact area at which flowing exhaust gases can interact with a hot catalyst coating the interior walls of the cells. In other gaseous emissions treatment such as particulate filters, there may or may not be catalyst coating on the passage walls. In particulate filters, a checkerboard subset of cells have their front ends plugged, a 'reverse' checkerboard subset of cells have their back ends plugged, and gaseous emissions are treated by being driven though porous walls of the honeycomb structure from cells of the first subset into cells of the reverse subset.

In the catalytic converter, interiors of the tubular cells 12 are wash-coated with a layer containing a particular catalyst material. A wash-coat typically contains a base material, suitable for ensuring adherence to the cured ceramic material of the substrate body, and entrained particulate catalyst material for promoting specific pollution-reducing chemical reactions. Examples of such catalyst materials are platinum and palladium which are catalysts effective in converting carbon monoxide and oxygen to carbon dioxide, and rhodium which is a catalyst suitable for converting nitric oxide to nitrogen and oxygen. Other catalysts are known which promote high temperature oxidation or reduction of other gaseous materials. The wash-coating is prepared by generating a suspension of the finely divided catalyst in a ceramic paste or slurry, the ceramic slurry serving to cause the wash-coat layer to adhere to the walls of the ceramic substrate body. As an alternative to wash-coating to place catalyst materials on the substrate body surfaces, the substrate body material itself may contain a catalyst so that brick walls themselves present catalyst material at the internal surfaces bounding the cells.

Exhaust gases from diesel (compression combustion) engines contain more nitrogen oxides than gasoline (spark combustion) engines. Long-term exposure to nitrogen oxides even at low levels can cause temporary or permanent respiratory problems. Selective catalytic reduction (SCR) is a method by which a liquid reductant is injected into a diesel engine exhaust flow to combine with nitrogen dioxide and nitric oxide (referred to collectively as $NO_x$) in the exhaust gas. A preferred reductant is aqueous urea $(2(NH_2)_2CO$ which is often referred to as diesel exhaust fluid (DEF). In the presence of a catalyst, ammonia resulting from thermal decomposition of the urea combines with the nitrogen oxides to produce less harmful products, chiefly nitrogen and water. Other reductants such as anhydrous ammonia and aqueous ammonia may also be used as an alternative to urea although especially for automotive application, on-board storage presents greater difficulty. Suitable catalysts may be any of certain metals oxides (such as those of molybdenum, vanadium, and tungsten), certain precious metals and zeolites. The typical temperature range for a SCR reaction is from 360° C. to 450° C. with a catalyst such as activated carbon being used to stimulate lower temperature reactions. As in gasoline (spark combustion engines), diesel (pressure combustion) engines may experience a period after a start-up where the exhaust temperature is too cool for effective SCR $NO_x$ reduction processes to take place. Other catalytic converters in which the present invention finds application for preheating or supplementary heating are lean NOX catalyst systems, lean NOX trap systems and non-selective catalytic reduction systems. The present invention is applicable also to each of these nitrogen oxide emissions treatment assemblies.

A gaseous emissions treatment assembly may have a series of the substrate bodies or bricks 10, each having a particular catalyst layer or emissions treatment mode depending on the noxious emission to be reduced or neutralized. Gaseous emissions treatment bricks may be made of materials other than fired ceramic, such as stainless steel. Also, they may have different forms of honeycombed cells or passages than those described above. For example, cells can be round, square, hexagonal, triangular or other convenient cross-sectional shape. In addition, if desired for optimizing strength and low thermal capacity or for other purposes, some of the extruded honeycomb walls can be formed so as to be thicker than other of the walls or formed so that there is some variety in the shape and size of cells. Junctions between adjacent interior cell walls can be sharp angled or can present curved profiles.

Typically, as shown in FIG. 1, the wash-coated ceramic honeycomb brick 10 is wrapped in a ceramic fibrous expansion blanket 16. A stamped metal casing or can 18 transitions between the parts of an exhaust pipe (not shown) fore and aft of the gaseous emissions treatment unit so as to encompass the blanket wrapped brick. The casing 18 is typically made up of two parts which are welded to seal the brick in place. The expansion blanket 16 provides a buffer between the casing 18 and the brick 10 to accommodate their dissimilar thermal expansion coefficients. The metal of the sheet metal casing 18 expands much more than the ceramic material of the brick at a given temperature increase and, if the two materials were bonded together or in direct contact with each other, destructive stresses would be experienced at the interface of the two materials. The blanket 16 also dampens vibrations from the exhaust system that might otherwise damage the brittle ceramic of the substrate body 10.

In use, the encased brick (or bricks) is mounted in the vehicle exhaust line to receive exhaust gases from the engine and to pass them to the vehicle tail pipe. The passage of exhaust gases through the gaseous emissions treatment unit heats the ceramic brick 10 to promote catalyst activated processes where the flowing gases contact the catalyst layer. Especially when the vehicle engine is being run at optimal operating temperature and when there is substantial throughput of exhaust gases, such treatment units operate substantially to reduce the presence of noxious gaseous emissions entering the atmosphere. Such units have shortcomings however at start-up when the interior of the brick is at low temperature, during idling during city driving or when waiting for a coffee at a Tim Hortons drive-through, and between electric driving periods for hybrid vehicles.

Brick shape, profile and cell densities vary among different manufacturers. For example, some bricks are round and some are oval. Some assemblies have single stage bricks that are generally heavily wash-coated with the catalyst metals, while others may have two or three bricks with different wash-coatings on each brick. Some exhausts have 900, 600 and 400 cpsi cell densities used in the full exhaust assembly, while others use only 400 cpsi bricks throughout. A close-coupled converter may be mounted up close to the exhaust manifold with a view to reducing the period between start-up and light-off temperature. An underfloor converter can be located further from the engine where it will take relatively longer to heat up but be relatively larger and used to treat the majority of gases once the exhaust assembly is up to temperature. In another configuration, a unit for reducing the period to light-off temperature and a unit to deal with high gas flow after light-off are mounted together in a common casing.

At one or more locations in the assembly, sensors mounted in the exhaust gas flow including within or adjacent the substrate body provide feedback to the engine control system for emission checking and tuning purposes. Aside from start-up, control of fuel and air input has the object typically of maintaining a 14.6:1 air:fuel ratio for an optimal combination of power and cleanliness. A ratio higher than this produces a lean condition—not enough fuel. A lower ratio produces a rich condition—too much fuel. The start-up procedure on some vehicles runs rich for an initial few seconds to get heat into the engine and ultimately the catalytic converter. The structures and operating methods described below for indirectly heating the catalyst layers and the exhaust gases can be used with each of a close-coupled catalytic converter, an underfloor converter, and a combination of the two. Outputs from the temperature sensors are taken to a controller at which the monitored temperature or temperatures are used to control when induction heating is switched on and off. Using an appropriate algorithm implemented at the controller, the monitored temperatures may also be used to control specific effects of the applied heating processes to achieve a particular heating pattern.

Figure 2:
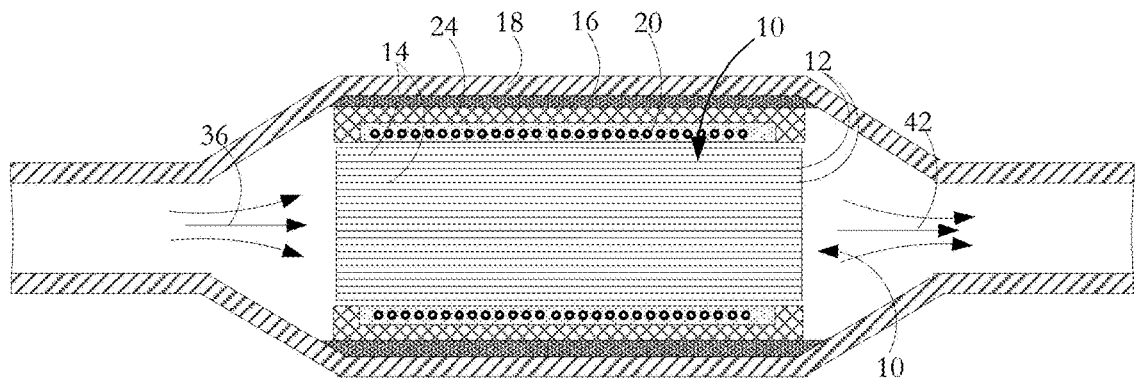
FIG. 2 is a longitudinal sectional view of a gaseous emissions treatment unit adapted for use in an embodiment of the invention.
Figure 3:
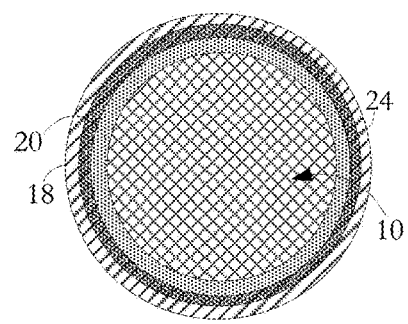
FIG. 3 is a cross-sectional view of the unit of FIG. 2.

As disclosed in U.S. Pat. No. 9,488,085, a gaseous emissions treatment assembly such as that shown in FIG. 1 is modified as shown in FIGS. 2 and 3 to enable induction heating. Induction heating is a process in which a metal body is heated by applying a varying electromagnetic field so as to change the magnetic field to which the metal body is subject. This, in turn, induces eddy currents within the body, thereby causing resistive heating of the body. In the case of a ferromagnetic metal body, heat is also generated by a hysteresis effect. When the non-magnetized ferromagnetic metal is placed into a magnetic field, the metal becomes magnetized with the creation of magnetic domains having opposite poles. The varying field periodically initiates pole reversal in the magnetic domains, the reversals in response to high frequency induction field variation on the order of 1,000s to 1,000,000s cycles per second (Hz) depending on the material, mass, and shape of the ferromagnetic metal body. Magnetic domain polarity is not easily reversed and the resistance to reversal causes further heat generation in the metal.

Figure 4:
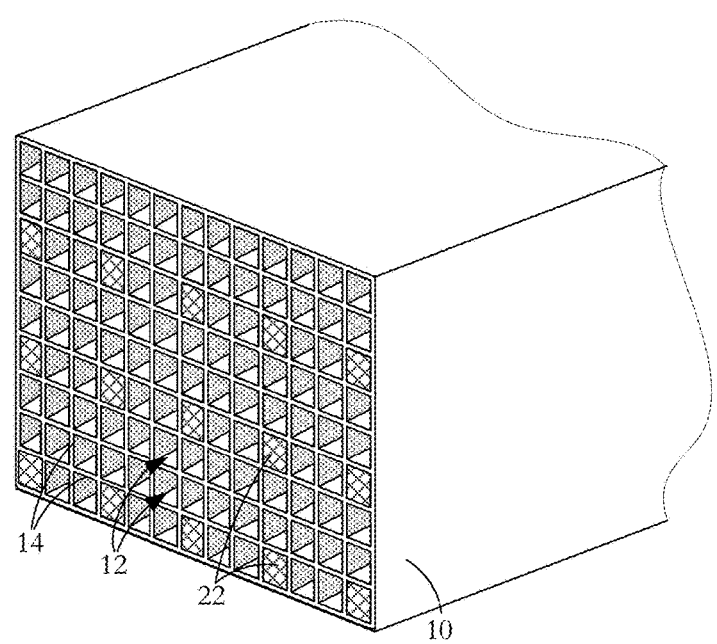
FIG. 4 is a perspective sectional view of a part of a gaseous emissions treatment unit according to an embodiment of the invention showing metal inserts located in cells of a substrate body.

As illustrated in FIGS. 2 and 3, surrounding the ceramic substrate body 10 is a metal coil 20 and, although not visible in FIG. 2, located fully within selected ones of the cells 12 are respective, discrete metal pins, rods, wires or other metal inserts 22 (FIG. 4). By generating a varying electromagnetic field at the coil 20, a chain reaction is initiated, the end result of which is that after start-up of a vehicle equipped with an exhaust system embodying the invention, light-off temperature may be attained more quickly in the presence of the varying electromagnetic induction field than if there were no such field. The chain reaction is as follows: the varying electromagnetic field induces eddy currents in the metal elements 22; the eddy currents cause heating of the metal elements; heat from the metal elements 22 is transferred to the ceramic substrate body 10; heat from the heated substrate body 10 is transferred to exhaust gas as it passes through the emissions control unit; and the heated exhaust gas causes catalytic reactions to take place more quickly at the walls 14 compared to unheated exhaust gas. Conduction from the heated wires, pins or other filling elements 22 is the primary source of heat transfer to the ceramic substrate 10 and therefore to the exhaust gases when the emissions unit is in operation. There is also a small amount of convective and radiated heat transfer at any small air gaps between a wire and the interior surface of the cell within which it is contained.

The coil 20 is a wound length of copper tube, although other materials such as copper wire or litz wire may be used. Copper tube is preferred because it offers high surface area in terms of other dimensions of the coil; induction being a skin-effect phenomenon, high surface area is of advantage in generating the varying field. If litz wire or copper wire is used, an enamel or other coating on the wire is configured not to burn off during sustained high temperature operation of the converter. An air gap between the coil 20 and the nearest inductance metal wires 22 prevents significant heat transfer from the wires 22 to the coil 10 which would otherwise increase the coil resistivity and so lower its efficiency.

A layer 24 of electromagnetic field shielding/concentrating material is located immediately outside the coil 20 to provide induction shielding and to reduce induction loss to the metal converter housing. The layer 24 also acts to increase inductive coupling to the metal in the substrate body 10 to focus heating. The shield/concentrator 24 can be made from a ferrite or other high-permeability, low-power-loss materials such as Giron, MagnetShield, Papershield, Finemet, CobalTex, or other magnetic shielding material that can be arranged to surround some or all of the windings of the coil 20. In particular, the magnetic shield 24 operates as a magnetic flux concentrator, flux intensifier, diverter, or flux controller to contain the magnetic fields within the substrate body. The magnetic shield lowers loss by mitigating undesirable heating of adjacent conductive materials. Without the magnetic shield/concentrator 24, magnetic flux produced by the coil 20 could spread around the coil 20 and link with the electrically conductive surroundings such as the metal casing 18 and other surrounding metal in an exhaust system, and/or other components of an internal combustion engine, vehicle, generator or other electrical system or host system, decreasing the life of these components and increasing energy loss. In addition, the layer 24 operates to direct or concentrate the magnetic field to the substrate body 10 providing selective or enhanced heating of a desired region of the substrate body 10, for example, by redirecting magnetic flux that would otherwise travel away from that desired region. In particular, the layer 24 operates to concentrate the magnetic flux produced by the coil 20 in the direction of the metal wires or rods 22 in the substrate body 10 for more efficient heating. As an additional benefit, the magnetic shield can improve the electrical efficiency of the induction coil 20 by increasing power transfer.

The coil is contained in a fiber insulation sheath 26 with the sheathed coil being encased in a in cast, cured insulation. The sheath functions both to stabilize the coil position and to create an air-tight seal to confine passage of the exhaust gases through the ceramic honeycomb substrate body 10 where catalytic action takes place. The insulation also provides a barrier to prevent the induction coil 20 from shorting on the converter can 18 or the ferrite shield 24. The insulation is suitably alumino-silicate mastic. Alternatively, the substrate body can be wrapped in an alumino-silicate fiber paper. In one manufacturing method, the copper coil 20 is wrapped around the substrate body and then placed in the casing or can 18. In an alternative manufacturing method, the coil 20 is placed in the can or casing 18 and the substrate body 10 is inserted into the coil/can assembly.

A varying electromagnetic induction field is generated at the coil by applying power from either a DC or AC source. Conventional automobiles have 12 VDC electrical systems. The induction system can operate on either DC or AC power supply. The induction signal produced can also be either DC or AC driven. For either DC or AC, this produces a frequency of 1 to 200 kHz, a RMS voltage of 130 to 200V and amperage of 5 to 8 A using 1 kw of power as an example. In one example suitable for road vehicles, a DC to DC bus converts the vehicle's 12 VDC battery power to the required DC voltage outlined above. In another example suitable for conventional road vehicles, a DC to AC inverter converts the vehicle's 12V DC battery power to the desired AC voltage outlined above. Another example is more suited to hybrid vehicles having both internal combustion engines and electric motors have on-board batteries rated in the order of 360V voltage and 50 kW power. In this case, the battery supply power is higher, but the same basic DC to DC bus or DC to AC inverter electrical configuration can be applied. An insulated gate bipolar transistor (IGBT) or metal-oxide-semiconductor field effect transistor (MOSFET) high speed switch is used to change the direction of electrical flow through the coil. In terms of the effect of a varying electromagnetic induction field on metal in the ceramic substrate body, a low switching frequency produces a longer waveform providing good field penetration below the surface of the metal element and therefore relatively uniform heating. However, this is at the sacrifice of high temperature and rapid heating owing to the lack of switching. In contrast, a high switching frequency produces a shorter waveform, which generates higher surface temperature at the sacrifice of penetration depth. Applied power is limited to avoid the risk of melting the metal elements or having them reach Curie point. A suitable power input to a single brick coil is of the order of 1.1 kw.

As previously described, discrete inserts 22 such as wires, pins or other filling made of ferromagnetic or other metal are located at selected locations of the ceramic substrate body 10 as shown in the detail view of FIG. 4. In the case of wires, they may be fixed in place by a friction fit at least partially achieved by closely matching the wire exterior area dimensions to the cell area dimensions so that surface roughness of the wire surface and the cell walls 14 holds the wires 22 in place. Additionally, a wire can be formed with a resiliently flexible element (not shown) which is flexed from a rest condition as the wire is inserted into a cell so that a part of the wire bears against an interior wall of the cell 12 and so provides frictional retention. The overall friction fit can be such as to resist gravity, vibration, temperature cycling, and pressure on the wires as exhaust gases pass through the substrate body.

Wires 22 may alternatively, or in addition, be fixed into the respective cells by bonding outer surfaces of the wires to interior surfaces of the cell walls 14. A suitable composite adhesive may be a blend of materials chosen to reduce temperature cycling stress effects in which there may be significant metal wire expansion/contraction, but vanishingly small expansion/contraction of the ceramic substrate. This differential can produce stresses at the adhesive interface between the two materials. By using such a composite adhesive, movement of a bonded wire relative to the surrounding cell walls may be reduced while maintaining high heat transfer. Metal inserts may alternatively be introduced into selected cells as molten metal, metal slugs or metal power which is then treated to render the inserted material in such a state and relationship with the walls of the substrate as to retain metal in the selected cells.

Field produced by the electromagnetic induction coil can be tuned to the metal wire load to achieve high efficiency in terms of generating heat and reduced time to light-off temperature. Heating effects can be modified by appropriate selection of any or all of (a) the electrical input waveform to the coil 20, (b) nature and position of passive flux control elements such as the shield/concentrator 24, and (c) nature, position, and configuration of the coil 20. In addition, the applied field can be changed with time so that there is interdependence between the induction field/heating pattern and the particular operational phase; for example, pre-start-up, warm-up, highway driving, idling and for hybrids, intermittent change over from internal combustion to electric drive. In an alternative configuration, more than one coil can be used to obtain desired induction effects. For example, a substrate body having an annular cross-section can have one energizing coil at the substrate perimeter and a second energizing coil at the substrate core (not shown).

The heating pattern can be determined by appropriate location and configuration of the discrete metal pins or wires 22. A suitable metal for the inserted wire is a ferromagnetic metal such as stainless steel grade 430 which has high magnetic permeability and corrosion resistance. Lower permeability alloys such as 300 or 400 series stainless steels may also be used. Alternative metals can be used depending on particular properties required in making the wire inserts and in fixing inserts within selected cells of the ceramic substrate. Such properties include metal formability, ductility, softness and elasticity. For shaping the direction and strength of magnetic flux in the substrate, lower magnetic permeability metals or alloys may be used for metal inserts in the outer cells with relatively higher magnetic permeability metals being used for metal inserts in the inner cells. Metals having very high magnetic permeability may also be used. For example, Kanthal iron-chrome-aluminum alloys used in wires manufactured by Sandvik have a relative permeability of 9000 and greater. High relative permeability can be achieved using wires made of other alloys including nickel-iron and iron-cobalt alloys.

It is desirable to have intense rapid heating of a substrate so that the whole substrate reaches light-off temperature rapidly. Minimizing the period to light-off is important to overall emissions reduction because there is virtually no catalyst promoted treatment of gaseous emissions below this temperature. For a given applied power level, low pin density results in hot regions at pin sites but cold regions between them. Although pin sites may achieve light-off temperature relatively quickly, the fraction of the ceramic substrate cross-sectional area at or above light-off temperature may not be high enough to induce and maintain overall light-off temperature. Exhaust gas flowing through the narrow substrate passages is at approximately the same temperature as that of the local ceramic, so gas passing through cold passages is untreated.

Although in current commercial use, a substrate such as substrate 10, may typically have a length of from 3 to 6 inches, if an upstream section of the substrate 2 inches or even less in length is at light-off temperature over its full extent, then emissions gas passing through that part of the substrate will quickly drive downstream catalyst coated areas to light-off temperature. Catalytic reactions that take place at and above the light-off temperature are generally exothermic so that after light-off is achieved upstream, a self-fuelling cascade effect is produced at the downstream part of the substrate. Consequently, although an inductively heated front section may be narrow compared with that part of the substrate that is not inductively heated, sufficient mass flow and heat may exist to drive the rest of the substrate rapidly to light-off temperature. The exothermic catalyst promoted burning of unburned components in the exhaust gas develops downstream into a chain reaction after the small upstream substrate section reaches light-off.

Rapid heating to light-off temperature can be achieved by using high pin density with pin heating sites located close together so that the light-off temperature is attained across the full cross section of the substrate. However, increased density of packing of metal inserts 22 into the passages 12 increases pressure drop through the system and so limits how much of the cross-sectional area of the ceramic substrate 10 can be blocked with metal inserts 22. This, in turn, limits how much of the cross-sectional area of the substrate will reach light-off temperature during operation. Pressure drop over the length of an emissions treatment assembly is related to the amount of work required for an engine to drive its gaseous emissions through the assembly. The more work the engine most do to deal with emissions treatment, the less efficient it is in terms of turning burning of fuel into driving the vehicle. Pressure drop for an assembly such as that with which the present invention is concerned originates from three sources: frictional losses, impingement losses, and expansion losses. Frictional losses are due to exhaust flow along the narrow cells of the substrate. Impingement losses are due to the blocking cross-sectional area that the exhaust flow encounters at the face of the substrate, this including the end walls of the cells and any cells that are occluded by metal inserts. Expansion losses are due to transition in flow as emissions gases exit the ceramic substrate at high velocity, with the gas from discrete channels expanding into a slower flowing mass. While the diameter of the substrate can be increased to compensate for additional pressure drop caused by the presence of more pins, this requires a bigger unit and higher materials cost.

In a substrate such as that shown in FIG. 1, pressure drop from frictional losses has an approximately linear relationship with length and accounts for about 90% of total pressure drop in for example, a unit having a 3 inch (0.0762 metres) ceramic substrate, a cpsi (cells per square inch) between 400 and 900 and an exhaust gas flow rate of 5 metres/second. If, as shown in FIG. 4, selected passages are stacked with pins at a packing density of 1:x, the pressure drop increases by about (100/x) %, a cell 12 being considered blocked by a pin 22 regardless of pin length.

Given a substrate of length 'L' and pin density '1:x' resulting in a certain pressure drop P, the pressure drop P remains approximately the same if one part of the substrate of length 'L/2' has a pin density of 1:x/2 and the remaining part of the substrate of length 'L/2' has open unblocked cells. This relationship extends beyond the above example, with the pressure drop again being substantially unchanged for a first substrate part of length 'L/3' and pin density '1:x/3' and the remaining part of the substrate of length '2 L/3' having open unblocked cells. With such arrangements, however, while the pressure drop remains relatively constant, more heating sites are present. This means that, depending on other requirements of the system, pin density and relative length of the heated part of the substrate can be adjusted without significantly affecting the pressure drop though the system. In particular, a smaller volume of substrate can be inductively heated in order to attain light-off temperature more quickly than if the whole substrate were subjected to the same power input.

Figures 5, 5A, 5B:
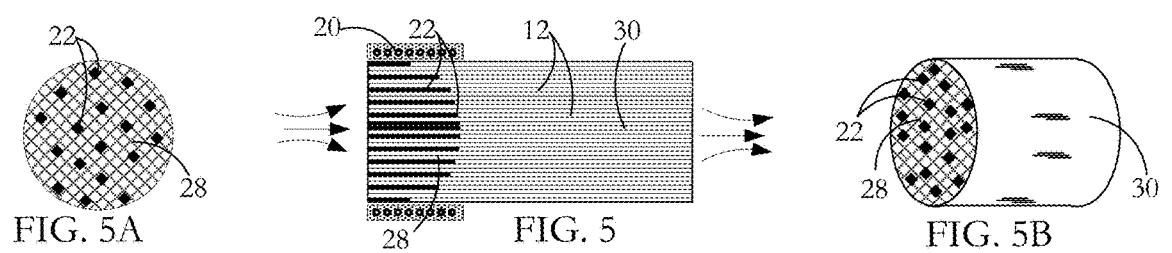
FIGS. 5, 5A and 5B are respectively longitudinal sectional, cross-sectional and perspective views of a gaseous emissions treatment unit according to another embodiment of the invention, the unit adapted for front end heating.

In one embodiment of the invention as shown in FIGS. 5, 5A and 5B, placement of pins 22 and their inductive heating by coil 22 is limited to a front part of the substrate where the exhaust gas enters. The front part 28 of the substrate 10 has a high pin stacking density and the passages 12 in the rear part 30 of the substrate are open and unblocked. For practicality in terms of operation, the length relationship between the front and rear parts 28, 30 and the pin stacking density of the front part 28 depends at least partly on whether the heating characteristics and the resulting pressure drop are operationally acceptable.

In the illustrated embodiment of FIGS. 4 and 5, metal inserts 22 occupy a regular array of 1 in 9 passages at the front part 28 of the substrate 10 with occupied passage lengths to the rear of the pins 22 being open. Also in this embodiment, the front part has a maximum pin length which is 50% of the length of the rear part or 33% of the overall substrate length. The pins 22 in the front part of the substrate are distributed with their trailing ends in a D or parabola shape. Magnetic flux from the surrounding coil 20 is strongest closest to the coil 22 and weakens further away from it. The D-shaped wire array distributes the magnetic flux well and also compensates for inductive energization being a "line of sight" process whereby wires 22 near the interior of the substrate 10 may be in the shadow of energized wires nearer the coil 20. Depending on system demands including heating and emissions treatment requirements and structural features such as cells per square inch and actual length of the brick, the passages 22 at the front of the brick can be packed at more or less than 1:9 provided that gaseous emissions can pass through the brick without unacceptable pressure drop through the system and provided the pins 22 provide sufficient metal per unit volume to achieve a desired heating profile in the heated front 28 without damaging the pin material. The parabola or D stacking of pins can be longitudinally reversed although the configuration shown is preferred for ease of placing the metal inserts during manufacture. In one example of D stacking of pins, a 50 mm substrate slice in which generally uniform output temperature across the substrate was obtained, the shortest pin used was 9 mm. in length (at the outside of the heater slice) and the longest pin length was 50 mm (at the centerline).

The length of the front part compared to the total length of the substrate can be less than 33% provided the front part of the substrate is large enough to accommodate the desired level of pin packing given that there is a lower limit to pin length for increasing heating intensity. The induction system requires substantial load (in this case, mass of pin material) to absorb the magnetic flux. Too little mass can lead to overheating and melting of the pins and the loss of electrical to thermal efficiency if the pin material reaches its Curie point. At that temperature, electromagnetic characteristics of the pin material deteriorate. Also with large power applied to a small load, the power supply may overheat and fail. In the rear part 30 of the substrate 10, the passages 22 should have enough catalyst coated surface (or particulate filter surface in the case of particulate filters) effectively to treat the emissions gases passing through the system.

Concentrating heating at the front 28 of the substrate increases the heat that each wire generates for a given pin array pattern and input power and so increases localized heating. However, an issue with the structure is that ceramic of substrate 10 conducts heat away in all directions during the heating cycle. This effectively increases the total volume of the ceramic that the heat occupies and therefore reduces the intensity over the volume of the pin occupied sites for a particular power input.

Figures 6, 6A, 6B:
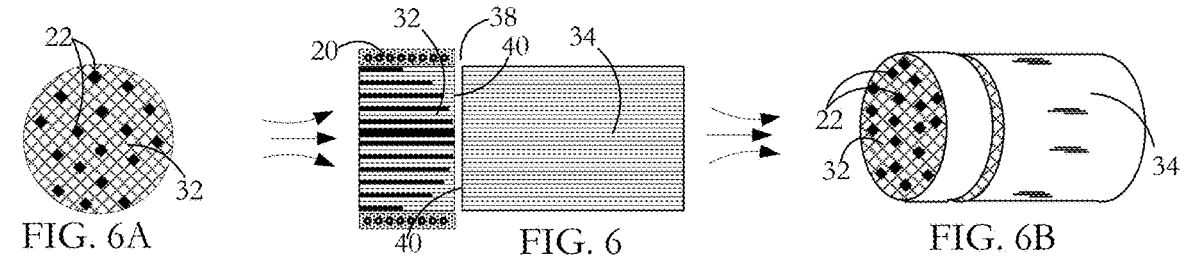
FIGS. 6, 6A and 6B are respectively longitudinal sectional, cross-sectional and perspective views of a gaseous emissions treatment unit according to a further embodiment of the invention, the unit also adapted for front end heating.

In another embodiment of the invention as illustrated in FIGS. 6, 6A and 6B, the assembly has a front substrate 32 or 'slice' that is separate from a rear substrate 34. The two substrates are mounted in line with a selected subset of the cells or passages of the slice substrate 32 occupied by discrete metal inserts 22 such as wires, pins or other forms of metal filling to enable inductive heating, and with the cells or passages 12 of the rear brick 34 being open and unrestricted over the lengths thereof and adjacent the ends thereof. In the illustrated embodiment, the slice substrate 32, in terms of the direction 36 of flow of emissions gas to be treated, is substantially shorter than the rear brick 34. Although the front slice substrate 32 has an important function as a heater, walls of the front brick passages 22 can be coated with emissions treatment catalyst so that the slice substrate 32 is operable both to heat and treat emissions gas before it passes from the front brick 32 across a gap 38 into the rear brick 34 to be treated in a further catalyst-promoted reaction.

In this embodiment, pressure drop impact is reduced by having the inductively heated front unit 32 separate from the downstream unit 34 with the downstream unit being heated by the passage of hot gas from the front unit. The pin packing density and so the number of heating sites per unit cross-sectional area of the unit 32 is significantly increased so as to attain hot regions at the pins 22 and relatively hot regions between the closely spaced pins. The result is a relatively uniform temperature reached across the full cross section of the slice 32 sufficient for light-off temperature to be attained quickly. The bricks 32 and 34 are separated by a distance of the order of 2 to 6 mm. At this separation, gaseous emissions passing along the slice substrate 32 with a typical flow velocity of from less than 0.5 metres per second to greater than 5 metres per second readily adapt from flow in the front brick 32 to flow in the rear brick 34 without materially increasing pressure drop. The orientation of the slice substrate 32 relative to the rear brick 34 is adjusted during assembly to reduce the area of wall end-to-wall end incidence; i.e., to increase the area of passage-to-passage incidence. To maintain the linear spacing, the bricks are held in alignment by a common jacket arrangement (not shown) similar to the jacket arrangement shown in FIGS. 2 and 3 or by any other suitable mounting. In a preferred embodiment, opposed faces 40 of the front and rear bricks 32, 34 are flat and perpendicular to the longitudinal axes of the bricks. However, the gap between the bricks 32 and 34 can be alternatively shaped, for example, generally to follow the dome/parabola shaped distribution of the pin trailing ends (FIG. 6E).

Figures 6C, 6D, 6E:
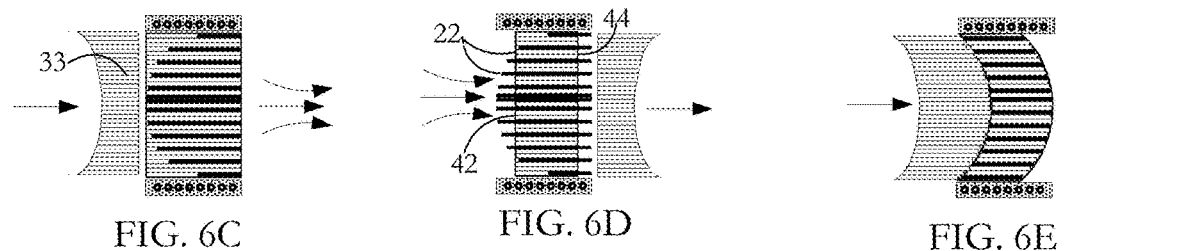
FIG. 6C is a longitudinal sectional of a gaseous emissions treatment unit according to a further embodiment of the invention, the unit adapted for back end heating of gas exiting an upstream brick.
FIG. 6D is a longitudinal sectional of a gaseous emissions treatment unit according to yet embodiment of the invention, the unit adapted for front end heating.
FIG. 6E is a longitudinal sectional of a gaseous emissions treatment unit according to yet another embodiment of the invention, the unit adapted for back end heating of gas exiting an upstream brick.

In another embodiment of the invention as shown in FIG. 6C, a heating slice substrate is mounted downstream of an emissions treatment brick. In this way, gas exiting the upstream brick 33 is given an inductive heating boost before passing further down the exhaust line to a subsequent emissions treatment brick.

The decoupled design of FIG. 6 has merit in terms of product integrity. Among materials frequently used for making substrates are low-expansion, honeycomb ceramics such as cordierite and silicon carbide. These materials are highly thermally insulating but are not zero-expansion materials so a temperature gradient can cause stresses to develop. Ideally, gradients are low enough that stresses do not accumulate sufficiently to cause a defect or substrate failure. However, as applied induction power levels increase in conjunction with heating applied over smaller areas/volumes, temperature gradients within the ceramic will correspondingly increase, heightening the risk of defects and failure. For the single substrate example of FIG. 5, temperature gradients are extreme because regions of the ceramic that are being heated are physically linked to cold regions having no heating. Hot regions can, for example, be 700° C. or greater while cold regions may be below 0° C., this variation being over a very short distance of the ceramic. A design with intense heating only at the front face and the rear kept cold is more prone to fail by popping of the front portion of the ceramic from the main body. The decoupled brick embodiment of FIG. 6 is characterized by a lower temperature gradient. The small volume of the front brick 32 allows even the brick extremities that are not directly heated to rise in temperature through conduction. This avoids the extreme 700° C. to 0° C. gradient presented above. Instead, 700° C. may be the maximum temperature but a minimum temperature of the order of 350° C. may prevail. Such a temperature gradient over a distance of about 3.5 centimetres (1.375 inches) is more manageable and configurable into commercial designs. Additionally, because of the absence of substrate material at the gap 38, heat is not lost by conduction towards the back of the assembly. This in turn means that generated heat that might otherwise be conducted away is retained in a smaller front volume to increase heating efficiency and speed.

A feature of the front-end heater with its high metal content to focus heating in a small volume at the front of a unit is that relatively densely packed metal acts to concentrate the field from the surrounding coil 20 to increase heating and, as a corollary acts to reduce undesirable field effects at the casing 18 (FIGS. 2, and 3).

Following are three examples of a front end heater slice configuration showing related structural properties and performance characteristics:

Example 1 a) Length of slice: 50 mm of cordierite substrate
b) Cpsi: 600
c) Length of longest pin—50 mm/shortest pin—9 mm/cross section 0.91 mm×0.91 mm
d) Weight of metal in slice: 298.7 grams/Volume 38.3 cm$^3$
e) Applied power: 10 kW draw
f) Time to light-off temperature (including the actual temperature) 8 seconds to 300 degrees
g) Pin and overall slice temperature: 681° C. pin temp with slice temperature locally being much the same In this example, the magnetic flux concentrator is relatively thick to handle high power and the coil is relatively large to handle high voltage.

Example 2 a) Length of slice: 50 mm cordierite
b) Cpsi: 600
c) Length of longest pin: 50 mm/shortest pin: 9 mm/cross section 0.91 mm×0.91 mm
d) Weight of metal in slice: 298.7 grams/Volume 38.3 cm$^3$
e) Applied power: 2 kW draw
f) Time to light-off temperature: 26 seconds to 300 degrees C.
g) Pin and overall slice temperature (presumably high but not over melt or Curie)? 450 C pin temp with slice temp locally being the same In this example, the magnetic flux concentrator is relatively thin because of the relatively low power and the coil is relatively small because the voltage is lower.

Example 3 a) Length of slice: 25 mm cordierite
b) Cpsi: 600
c) Length of longest pin 25 mm/shortest pin 6 mm/cross section 0.91 mm×0.91 mm
d) Weight of metal in slice: 149.4 grams/Volume 19.1 cm$^3$
e) Applied power: 2 kW draw
f) Time to light-off temperature: 16 seconds to 300 degrees C.
g) Pin and overall slice temperature 692 C pin temp with slice temp locally being the same.

In this example, the magnetic flux concentrator is relatively thin because of the relatively low power and the coil is relatively short because the slice is thinner.

In another embodiment of the invention as shown in FIG. 6D, the passages 12 of the heating slice substrate 32 are made only long enough as is required to provide necessary structural support for the pins 22. For example, the pins 22 can project forwardly from the front face 42 of the brick and/or can project rearwardly from the back face 44 of the brick. Consequently, certain parts of the pins 22 may be separated from adjacent pins by air instead of insulating ceramic which may increase conduction within the heating volume. In another embodiment of the invention, occupation of the slice passages by the wires or pins is in other than a D or parabola shape. For example, some or all of the pins can be of uniform length or some other configurations can be used to obtain desired heat profiles of exiting exhaust gas across the area of the slice.

The decoupled or slice configuration has further merit in relation to complex washcoated catalyst arrangements of the sort where the gaseous emissions are subjected to two or more different treatments. Application of catalyst washcoat is generally done by taking a bare substrate and dipping it into slurry that contains the catalyst metals and a porous ceramic carrier. Capillary action within the porous substrate wicks the water/liquid from the slurry and this deposits the precious metal and ceramic material on passage surfaces. Residence time during dipping and the number of dip cycles can be varied to produce thick washcoats which are desirable for maximum emissions treatment. A vacuum system is used to suck away excess liquid and then the washcoated substrate is heated to cure the washcoat onto the cell walls. Sometimes, two different washcoats are needed in a catalyst assembly; for example, when multiple emissions gases are being treated in a single system with each emissions gas requiring its own washcoat chemistry. Applying two different washcoats is challenging for a single substrate because in current commercial production processes, one washcoat is applied to one end of the substrate and a different washcoat is applied to the other end of the substrate. Submersion depth during dipping is difficult to control and generally a clean transition between two washcoats is not achieved. The washcoats inherently narrow the open area of the cells but there is frequently also taper to the washcoat thickness. Vacuum removal to leave a consistent thickness of washcoat material during coating is easier to achieve at substrate ends than at the middle of the substrate. The FIG. 6 heating slice design makes the dual washcoat process easier and generally gives better quality results.

In manufacturing substrate material, there are several different commercially available cpsi substrates to choose from, these typically including 400, 600, and 900 cpsi structures although higher cpsi substrates have been achieved. These substrates are also available with different wall thicknesses for a given cpsi. Also, substrates are available made from one of several different ceramic materials. There may be the need to optimize the performance or cost of a catalyst assembly. For example, a design could be optimized by using relatively costly 900 cpsi, thin wall (low mass), silicon carbide as the material of the front substrate and low cost, 400 cpsi, thick wall, cordierite substrate as the material of the back substrate. This is virtually impossible for a single substrate design because the cross-section form of a single substrate is fixed. Extrusion processes for manufacturing substrate material do not have the flexibility to allow a change in cpsi, wall thickness and/or material composition in the middle of extrusion. The slice embodiment of FIGS. 6, 6A and 6B allow for several possible combinations of substrate material properties to be included in the catalyst assembly for optimization of performance and cost.

Although in the FIGS. 6, 6A and 6B slice embodiment, the front brick 32 has catalyst coated passages 12, the passages may alternatively be devoid of catalyst, meaning that the brick serves solely as a pre-heater to heat emissions gases passing along its passages before crossing the gap 38 to the rear unit 34. Such a configuration allows optimization for heating in the way of size and profile of passages 12 and position, size and profile of metal inserts 22. In the previously described embodiments, the distribution of inductance metal elements relative to the positions of the cells is configured so that heating is generally uniform and rapid across a thin front substrate section or a separate substrate body. Localization of heating in an upstream pre-heater may be enhanced by using differently sized and or/shaped cells and differently sized, shaped and/or composition wires.

Figure 7:
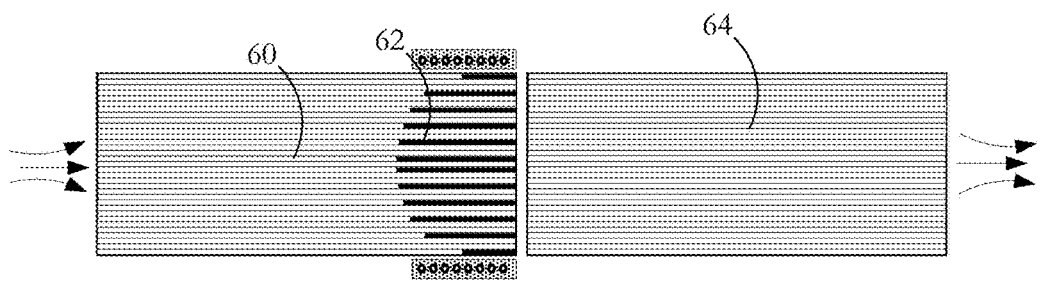
FIG. 7 is a longitudinal sectional view of a gaseous emissions treatment assembly according to another embodiment of the invention, a front gaseous emissions treatment unit adapted for back end heating to heat a downstream gaseous emissions treatment unit.
Figure 7A:
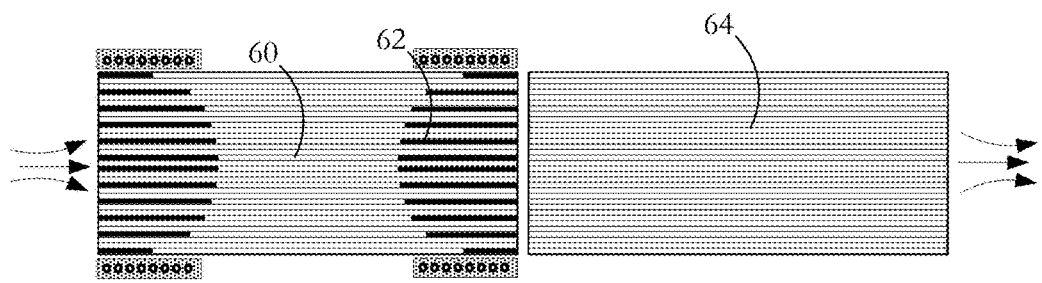
FIG. 7A is a longitudinal sectional view of a gaseous emissions treatment assembly according to another embodiment of the invention having a front unit configured for both inductive front end heating and back end heating thereby to heat a downstream gaseous emissions treatment unit.
Figure 7B:
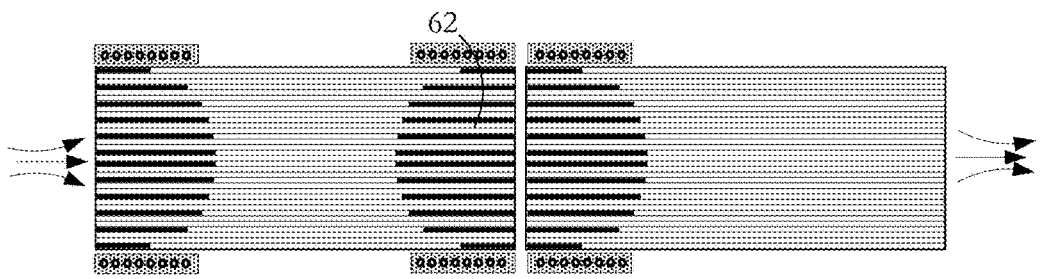
FIG. 7B is a longitudinal sectional view of a gaseous emissions treatment assembly according to another embodiment of the invention having both inductive front end heating and back end heating of an upstream unit, and inductive front end heating of a downstream unit.

In another embodiment of the invention as shown in FIG. 7, the substrate of an upstream brick 60 has an inductively heated rear end section 62 positioned immediately upstream of a downstream emissions gas treatment brick 64. The downstream substrate 64 may be inductively unheated and so depend for reaching light-off on the temperature of incoming emissions gases that are inherently hot by virtue of being exhaust gas or having had the exhaust gas temperature raised through inductive heating at the upstream unit 60. Alternatively, as shown in FIG. 7A, the upstream unit may additionally have an associated electromagnetic field generator at a front section of the upstream brick. Alternatively, as shown in FIG. 7B, the downstream brick may have an electromagnetic field generator at its front end. In each of FIGS. 7-7B, the three heating zones may be optionally energized at different times or to a different power level from each other. The upstream unit can also be configured for an emissions treatment that is different in type from the emissions gas treatment process occurring in the downstream unit. Any of the three end sections can be configured as a separate slice.

In the FIGS. 6 and 7, the various distributions of metal inserts in the inductively heated substrate can be looked on as a metal matrix.

Figure 8:
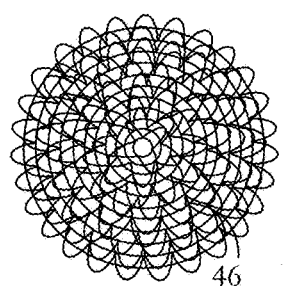
FIGS. 8 and 8A are end and perspective views respectively of an emissions treatment unit according to a further embodiment of the invention, the unit having a separate front end heater.
Figure 8A:
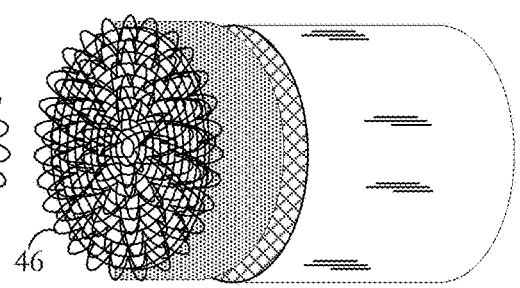

In a variation of the dedicated inductively heated preheater or post-heater embodiments shown in FIGS. 6 and 7, the metal matrix is an inductively heated coiled, corrugated metal slice 46 as shown in the embodiment of FIGS. 8 and 8A.

Figure 9:
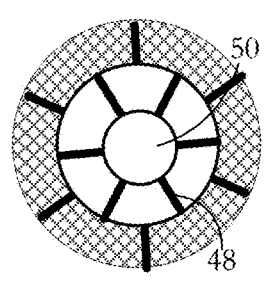
FIGS. 9 and 9A are end and perspective views respectively of an emissions treatment unit according to an embodiment of the invention, the unit having an alternative form of separate front end heater.
Figure 9A:
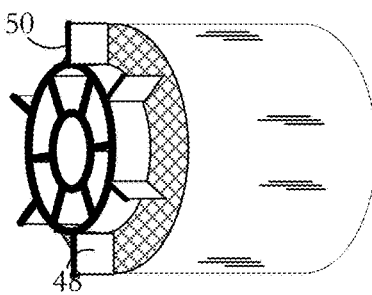

In a further embodiment, the metal matrix is a number of concentric metal blades 48 surrounding an open hub 50 as shown in the embodiment of FIGS. 9 and 9A.

Figures 10, 10A:
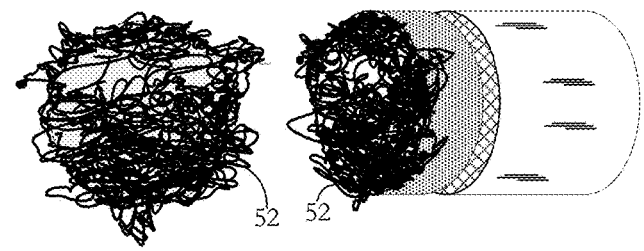
FIGS. 10 and 10A are end and perspective views respectively of an emissions treatment unit according to an embodiment of the invention, the unit of having a further alternative form of separate front end heater.

In a further embodiment, the metal matrix is a mesh of randomly distributed metal filaments 52 as shown in the embodiment of FIGS. 10 and 10A.

Figures 11, 11A:
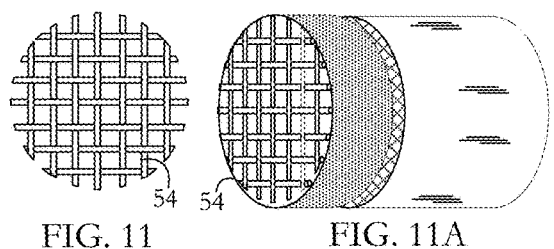
FIGS. 11 and 11A are end and perspective views respectively of an emissions treatment according to an embodiment of the invention, the unit of having yet another alternative form of separate front end heater.

In a further embodiment, the metal matrix is a woven mesh of metal filament 54 as shown in the embodiment of FIGS. 11 and 11A.

Figures 12, 12A:
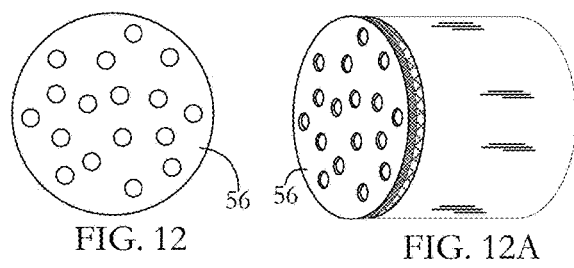
FIGS. 12 and 12A are end and perspective views respectively of an emissions treatment unit according to an embodiment of the invention, the unit having a further alternative form of separate front end heater.

In a further embodiment, the metal matrix is a perforated metal plate as shown in the embodiment of FIGS. 12 and 12A.

Figures 13, 13A:
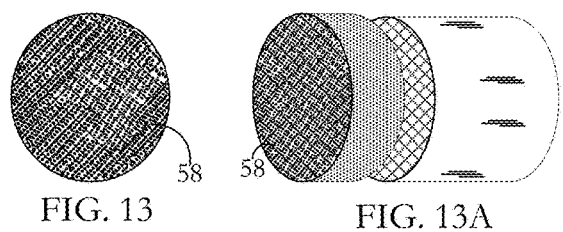
FIGS. 13 and 13A are end and perspective views respectively of a gaseous emissions treatment unit according to an embodiment of the invention, the unit having another alternative form of separate front end heater.

In a further embodiment, the pre-heater has a honeycomb ceramic substrate 32 but with ceramic constituting the honeycomb walls heavily doped with metal as indicated at 58 in the embodiment shown in FIGS. 13 and 13A.

In all of the illustrated pre-heater designs, the front brick pre-heater (or in some cases a post-heater) is optimized to provide a relatively dense metal load to enable rapid, high intensity inductive heating from the surrounding coil (not shown in FIGS. 8 to 13). However, the metal load is not so large nor the wires so densely packed as to affect the flow of emissions gas by introducing an unacceptable pressure drop into the exhaust line.

Figure 14:
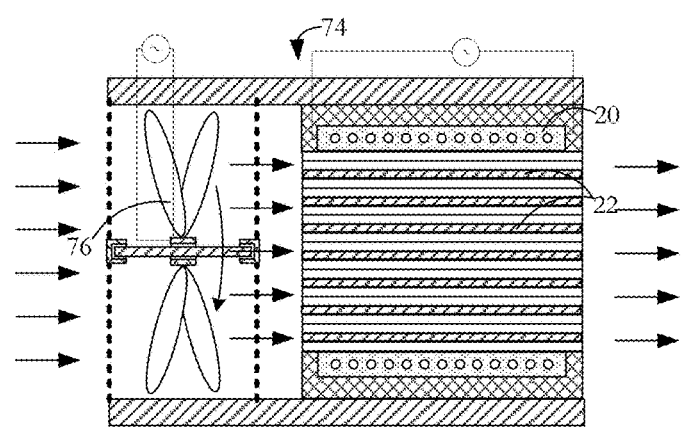
FIG. 14 is a side sectional view of a space heater according to an embodiment of the invention.

In another embodiment of the invention illustrated in FIG. 14, a heating unit for use as a space heater has a ceramic substrate body through which extend passages, with discrete metal inserts of wire, pins or other metal filling 22 in respective passages of a subset thereof. An induction coil 20 is mounted around the substrate body and is energized to generate a varying electromagnetic field so that at least some of the generated electromagnetic flux permeates the metal wire inserts 22 to inductively heat them. A fan 76 is mounted so as to force air along the passages that are not blocked by the metal wire inserts 22. In use, heat transfers from the inductively heated metal bodies to adjacent substrate body walls to heat the substrate body. In turn, at the unoccupied passages, heat transfers from the substrate body to heat air that is being forced along the passages by the fan. A heating unit of the sort illustrated in FIG. 14 can, for example, be used for cabin heating of a motor vehicle. This is of particular value for electric vehicles where there is no combustion engine or plug-in hybrids where engine operation and associated heating may not be available until some time after initial vehicle usage.

The induction heating configurations previously described and illustrated can be used with both catalytic converters and particulate filters (PFs). Such emissions treatment units can either be inductively heated in any of the arrangements previously described or can be positioned to receive heat from an inductively heated upstream unit, whether that is in the form of a section of a longer substrate or in the form of a separate slice.

Other variations and modifications will be apparent to those skilled in the art and the embodiments of the invention described and illustrated are not intended to be limiting. The principles of the invention contemplate many alternatives having advantages and properties evident in the exemplary embodiments.

What is claimed is:

1. An assembly for use in treating gaseous emissions comprising a first substrate body having a first plurality of linear passages extending the length of the first substrate body for the passage of emissions gas, the first substrate body having an elongate metal insert in each of a subset of the passages with concentration of metal per unit volume of the first substrate body increasing towards one end of the substrate, an induction heating coil mounted adjacent the substrate body for generating a varying electromagnetic field thereby to heat the first substrate body, and a second substrate body having a second plurality of linear passages for receiving emissions gas exiting from the other end of the first substrate body, the first substrate body generally aligned with, but separated from, the second substrate body.

2. The assembly as claimed in claim 1, the first substrate body separated from the second substrate body by a distance of the order of 2 to 6 mm.

3. The assembly as claimed in claim 1, the inserts having length, the maximum metal insert length substantially equaling the length of the first substrate.

4. The assembly as claimed in claim 1, the subset of passages occupied by said metal inserts representing a range between 1:2 and a 1:49 density occupation of the first plurality of passages.

5. The assembly as claimed in claim 1, the length of the first substrate body being a fraction of the length of the second substrate body, the fraction being between 2% and 50%.

6. The assembly as claimed in claim 1, the passages of the second substrate body being open.

7. The assembly as claimed in claim 1, the interior faces of the linear passages of the second substrate body coated with a first catalyst material for accelerating gaseous emissions treatment.

8. The assembly as claimed in claim 7, the interior faces of at least some of the linear passages of the first substrate body coated with a second catalyst material for accelerating gaseous emissions treatment.

9. The assembly as claimed in claim 8, the first and second catalyst materials being different from one another in at least one of chemical composition and physical application.

10. The assembly as claimed in claim 1, the number of passages per unit area of the first substrate body being different from the number of passages per unit area of the second substrate body.

11. The assembly as claimed in claim 1, the inserts being lengths of wire.

12. The assembly as claimed in claim 1, the substrate made of ceramic honeycomb material.

13. The assembly as claimed in claim 1, the second substrate body comprising a particulate filter.

14. The assembly as claimed in claim 1, wherein the first plurality of elongate metal inserts is positioned closer to said one end of the first substrate than the other end thereof.

15. The assembly as claimed in claim 1, wherein the first plurality of elongate metal inserts is positioned closer to said other end of the first substrate than said one end.

16. A gas heater comprising a ceramic honeycomb substrate body having a first plurality of passages extending the length of the substrate body for transmitting a flow of gaseous emissions directed into the passages at one end of the substrate from said one end to the other end thereof, the passages of the first plurality thereof being unrestricted over the lengths thereof and adjacent the ends thereof, a second plurality of linear passages extending the length of the substrate body, a first plurality of discrete elongate metal inserts blocking respective ones of the second plurality of passages, an induction heating coil mounted adjacent the substrate body for generating a varying electromagnetic field to inductively heat the metal inserts, and an internal combustion engine upstream of the substrate body for driving said flow of gaseous emissions therefrom into and through the passages of the first plurality thereof.

17. A space heater comprising a ceramic honeycomb substrate body having a first plurality of passages extending the length of the substrate body for transmitting a flow of air directed into the passages at one end of the substrate from said one end to the other end thereof, the passages of the first plurality thereof being unrestricted over the lengths thereof and adjacent the ends thereof, a second plurality of linear passages extending the length of the substrate body, a first plurality of discrete, elongate metal inserts blocking respective ones of the second plurality of passages, an induction heating coil mounted adjacent the substrate body for generating a varying electromagnetic field to inductively heat the metal inserts, and a fan mounted adjacent said one end of the substrate and operable to blow air into passages of the first plurality thereof and to force the blown air along the passages of the first plurality.

\* \* \* \* \*